United States Patent
Fujii et al.

(10) Patent No.: US 9,663,917 B2
(45) Date of Patent: May 30, 2017

(54) WORK VEHICLE, BUCKET DEVICE, AND METHOD FOR OBTAINING TILT ANGLE

(71) Applicant: KOMATSU LTD., Tokyo (JP)

(72) Inventors: Yuto Fujii, Hirakata (JP); Tsutomu Iwamura, Yokohama (JP); Masanobu Seki, Fujisawa (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/101,106

(22) PCT Filed: Oct. 16, 2015

(86) PCT No.: PCT/JP2015/079327
§ 371 (c)(1),
(2) Date: Jun. 2, 2016

(87) PCT Pub. No.: WO2016/052762
PCT Pub. Date: Apr. 7, 2016

(65) Prior Publication Data
US 2017/0107688 A1  Apr. 20, 2017

(51) Int. Cl.
| E02F 3/36 | (2006.01) |
| E02F 3/40 | (2006.01) |
| E02F 9/26 | (2006.01) |
| G01C 15/12 | (2006.01) |
| G01S 19/45 | (2010.01) |
| E02F 3/32 | (2006.01) |

(52) U.S. Cl.
CPC ............. *E02F 3/3681* (2013.01); *E02F 3/40* (2013.01); *E02F 9/265* (2013.01); *G01C 15/12* (2013.01); *G01S 19/45* (2013.01); *E02F 3/32* (2013.01)

(58) Field of Classification Search
CPC . E02F 3/3681; E02F 3/40; E02F 9/265; E02F 3/32; G01C 15/12; G01S 19/45
See application file for complete search history.

(56) References Cited

U.S. PATENT DOCUMENTS

| 6,098,322 A | 8/2000 | Tozawa et al. |
| 2015/0345114 A1 | 12/2015 | Nomura et al. |

FOREIGN PATENT DOCUMENTS

| JP | 3019505 A | 12/1995 |
| JP | 201455407 A | 3/2014 |
| JP | 2014-74319 A | 4/2014 |
| WO | 98/26132 A1 | 6/1998 |

OTHER PUBLICATIONS

The International Search Report for the corresponding international application No. PCT/JP2015/079327, issued on Jan. 12, 2016.
The Office Action for the corresponding Korean application No. 10-2016-7013388, issued on Feb. 28, 2017.

*Primary Examiner* — Anne M Antonucci
(74) *Attorney, Agent, or Firm* — Global IP Counselors, LLP

(57) ABSTRACT

A hydraulic excavator is equipped with a bucket, a tilt cylinder, a fourth stroke sensor, and a bucket information computing unit. The bucket is able to rotate about the center of a tilt axis. The tilt cylinder causes the bucket to rotate about the center of the tilt axis. The fourth stroke sensor detects a stroke length of the tilt cylinder. The bucket information computing unit obtains a tilt angle of the bucket on the basis of the stroke length detected by the fourth stroke sensor.

11 Claims, 13 Drawing Sheets

WORK VEHICLE, BUCKET DEVICE, AND METHOD FOR OBTAINING TILT ANGLE

CROSS-REFERENCE TO RELATED APPLICATIONS

This application is a U.S. National stage application of International Application No. PCT/JP2015/079327, filed on Oct. 16, 2015.

BACKGROUND

Field of the Invention

The present invention relates to a work vehicle and a bucket device.

Background Information

A work vehicle provided with a tiltable bucket that is able to rotate about the center of a tilt axis is known in the prior art. A tiltable bucket is rotated by a tilt cylinder coupled to the bucket.

In order to obtain a tilt angle which is a rotation angle of the bucket about the center of the tilt axis, a method for using an inclination angle sensor for detecting the inclination angle of the bucket is known (see Japanese Patent Laid-open No. 2014-55407).

SUMMARY

When, for example, a liquid-type inclination angle sensor for detecting the inclination angle is used as the inclination angle sensor based on the behavior of an air bubble that moves inside the liquid in response to the movement of the bucket, it may be difficult to obtain the tilt angle data depending on the posture of the bucket. The tilt angle data may not be detected accurately with this type of inclination angle sensor.

An object of the present invention is to provide a work vehicle, a bucket tilt device, and a method for obtaining a tilt angle in which the tilt angle can be detected accurately in consideration of the above conditions.

A work vehicle according to a first aspect is equipped with a bucket, a tilt cylinder, a stroke length detecting unit, and a bucket information computing unit. The bucket is configured to rotate about a center of a tilt axis. The tilt cylinder is configured to cause the bucket to rotate about a center of the tilt axis. The stroke length detecting unit is configured to detect the stroke length of the tilt cylinder. The bucket information computing unit is configured to obtain a tilt angle of the bucket on the basis of the stroke length detected by the stroke length detecting unit.

According to the work vehicle of the first aspect, the bucket information computing unit is able to detect the tilt angle of the bucket by using the stroke length of the tilt cylinder detected by the stroke length detecting unit. Therefore, the tilt angle can be detected accurately regardless of the posture of the work vehicle.

The work vehicle according to a second aspect is related to the first aspect, and the bucket information computing unit calculates an angle formed by a first line segment and a second line segment when viewing the tilt cylinder from an axial direction of the tilt axis. The first line segment links a first end part and the tilt axis of the tilt cylinder. The second line segment links a second end part and the tilt axis of the tilt cylinder. The bucket information computing unit calculates the formed angle to calculate the tilt angle.

The work vehicle according to a third aspect is related to the second aspect, and the bucket information computing unit calculates a difference between the formed angle and a reference angle at a reference position of the bucket as the tilt angle.

The work vehicle according to fourth aspect is related to any of the first to third aspects, and the bucket information computing unit specifies a position of the bucket on the basis of the tilt angle.

According to the work vehicle of the fourth aspect, the position of the bucket can be specified accurately.

The work vehicle according to a fifth aspect is related to any one of the first to fourth aspects, and is further equipped with a display unit configured to display the bucket, and a display controller configured to cause the bucket to be displayed on the display unit on the basis of the tilt angle.

According to the work vehicle of the fifth aspect, the posture of the bucket can be displayed accurately on the display unit.

The work vehicle according to a sixth aspect is related to any one of the first to fifth aspects, and the first end part of the tilt cylinder is coupled to the bucket. The second end part of the tilt cylinder is positioned between the tilt axis and the bucket when viewing the tilt cylinder from the axial direction. The interval between the first end part and the second end part in a horizontal direction is no less than the first line segment.

According to the work vehicle of the sixth aspect, the stroke length of the tilt cylinder can be lengthened per unit of tilt angle of the bucket. As a result, the tilt angle can be detected more accurately because the inclination angle can be calculated accurately.

The work vehicle according to a seventh aspect is related to any one of the first to fifth aspects, and the first end part of the tilt cylinder is coupled to the bucket. The second end part of the tilt cylinder is positioned opposite the bucket relative to a horizontal plane passing through the tilt axis when viewing the tilt cylinder in the axial direction.

According to the work vehicle of the seventh aspect, the stroke length of the tilt cylinder can be lengthened per unit of tilt angle of the bucket. As a result, the tilt angle can be detected more accurately because the inclination angle can be calculated accurately.

A bucket device according to an eighth aspect is equipped with a bucket, a tilt cylinder, and a stroke length detecting unit. The bucket is configured to rotate about a center of a tilt axis. The tilt cylinder is configured to cause the bucket to rotate about a center of the tilt axis. The stroke length detecting unit is configured to detect the stroke length of the tilt cylinder.

A method for obtaining a tilt angle according to a ninth aspect has a step detecting a stroke length of the tilt cylinder configured to cause a bucket to rotate about the center of a tilt axis, and a step obtaining a tilt angle of the bucket on the basis of the stroke length.

According to exemplary embodiments of the present invention, a work vehicle, a bucket tilt device, and a method for obtaining a tilt angle can be provided in which the tilt angle can be detected accurately.

DESCRIPTION OF EXEMPLARY EMBODIMENTS

Overall Configuration of Hydraulic Excavator CM

A configuration of a hydraulic excavator construction machinery (CM) as an example of a work vehicle according to an exemplary embodiment shall be explained in detail with reference to the drawings. The positional relationships of the configurations will be explained hereinbelow while referring to a global coordinate system and a local coordinate system.

The global coordinate system is based on an origin Pg (see FIG. 4) positioned in a work area and fixed on the Earth. The global coordinate system is defined by a XgYgZg Cartesian coordinate system. The Xg-axis direction is one direction in a horizontal plane, the Yg-axis direction is a direction orthogonal to the Xg-axis direction in the horizontal plane, and the Zg-axis direction is a direction orthogonal to both the Xg-axis direction and the Yg-axis direction. Therefore, the Xg axis is orthogonal to the YgZg plane, the Yg axis is orthogonal to the XgZg plane, and the Zg axis is orthogonal to the XgYg plane. The XgYg plane is parallel to the horizontal plane and the Zg-axis direction is in the vertical direction. Further, the respective rotational directions around the Xg axis, the Yg axis, and the Zg axis are the θXg direction, the θYg direction, and the θZg direction.

The local coordinate system is based on an origin P0 (see FIG. 4) fixed on a vehicle body 1 of the hydraulic excavator CM. The origin P0 which is the reference position of the local coordinate system is positioned on the center of revolution AX of a revolving superstructure 3. The local coordinate system is defined by an XYZ Cartesian coordinate system. The X-axis direction is one direction in a predetermined horizontal plane, the Y-axis direction is a direction orthogonal to the X-axis direction in the predetermined horizontal plane, and the Z-axis direction is a direction orthogonal to both the X-axis direction and the Y-axis direction. The X axis is orthogonal to the YZ plane, the Y axis is orthogonal to the XZ plane, and the Z axis is orthogonal to the XY plane. Further, the respective rotational directions around the X axis, the Y axis, and the Z axis are the θx direction, the θy direction, and the θz direction.

Figure 1:
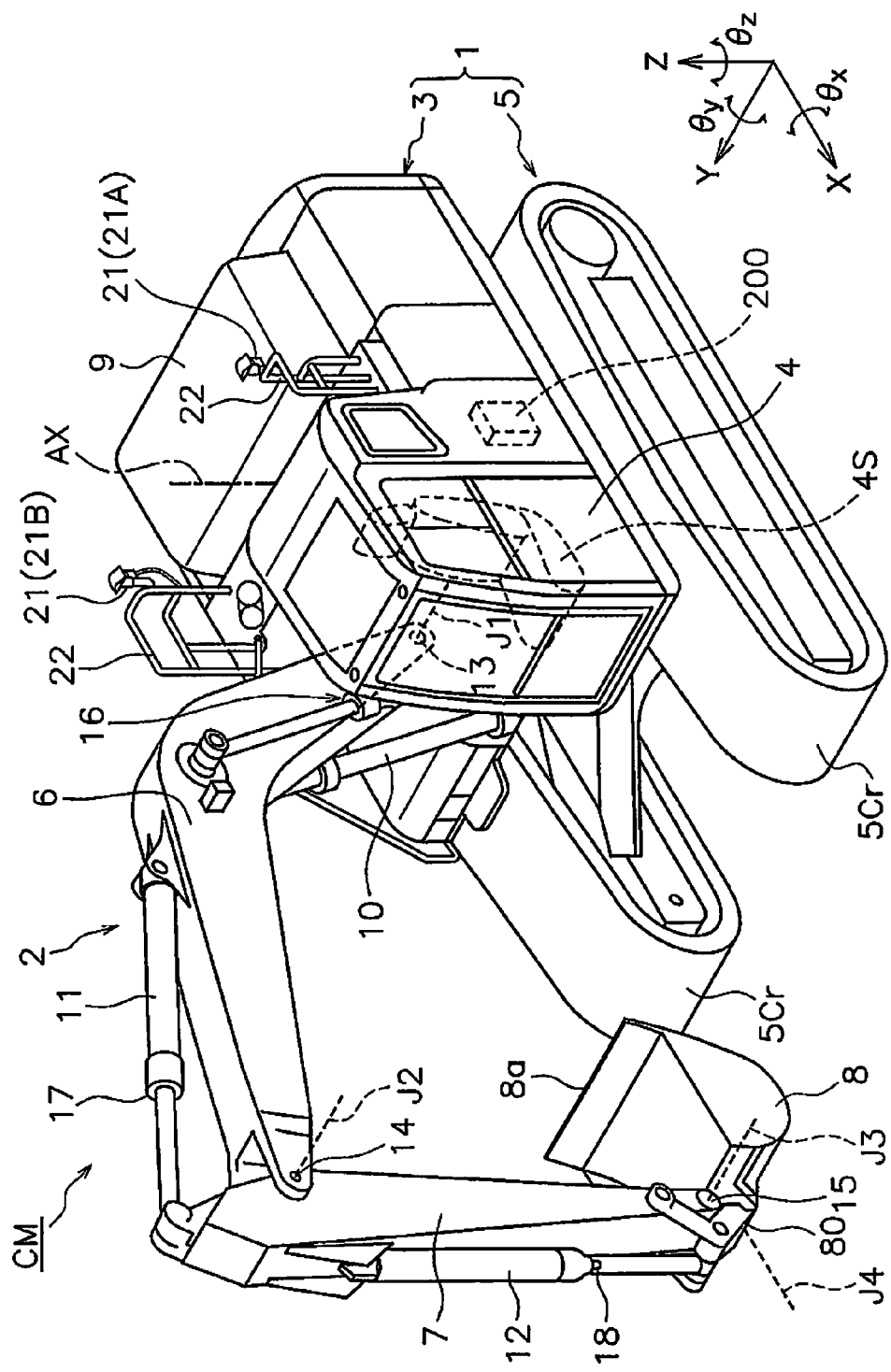
FIG. 1 is a perspective view of a hydraulic excavator.

FIG. 1 is a perspective view illustrating an overall configuration of the hydraulic excavator CM. The hydraulic excavator CM is equipped with the vehicle body 1 and working equipment 2. The hydraulic excavator CM has mounted thereon a control system 200 for executing excavation control.

In the following explanation, "front," "rear," "left" and "right" are defined by the positional relationships when the attachment position of the work implement 2 is in the forward direction as seen from the vehicle body 1. The front-back direction is the X-axis direction and the left-right direction is the Y-axis direction. The left-right direction is the same as the width direction of the vehicle (referred to below as "vehicle width direction").

The vehicle body 1 has the revolving superstructure 3, a cab 4, and a travel device 5. The revolving superstructure 3 is disposed on the travel device 5. The travel device 5 supports the revolving superstructure 3. The revolving superstructure 3 is able to revolve about the center of the axis of revolution AX. An operating seat 4S on which the operator sits is provided inside the cab 4. The operator operates the hydraulic excavator CM from the cab 4. The travel device 5 has a pair of crawler belts 5Cr. The pair of crawler belts 5Cr rotate thereby allowing the hydraulic excavator CM to travel.

The revolving superstructure 3 has an engine room 9 in which an engine and a hydraulic pump and the like are housed, and a counterweight provided in the rear part of the revolving superstructure 3. A handrail 22 is provided in front of the engine room 9 on the revolving superstructure 3.

Figure 2:
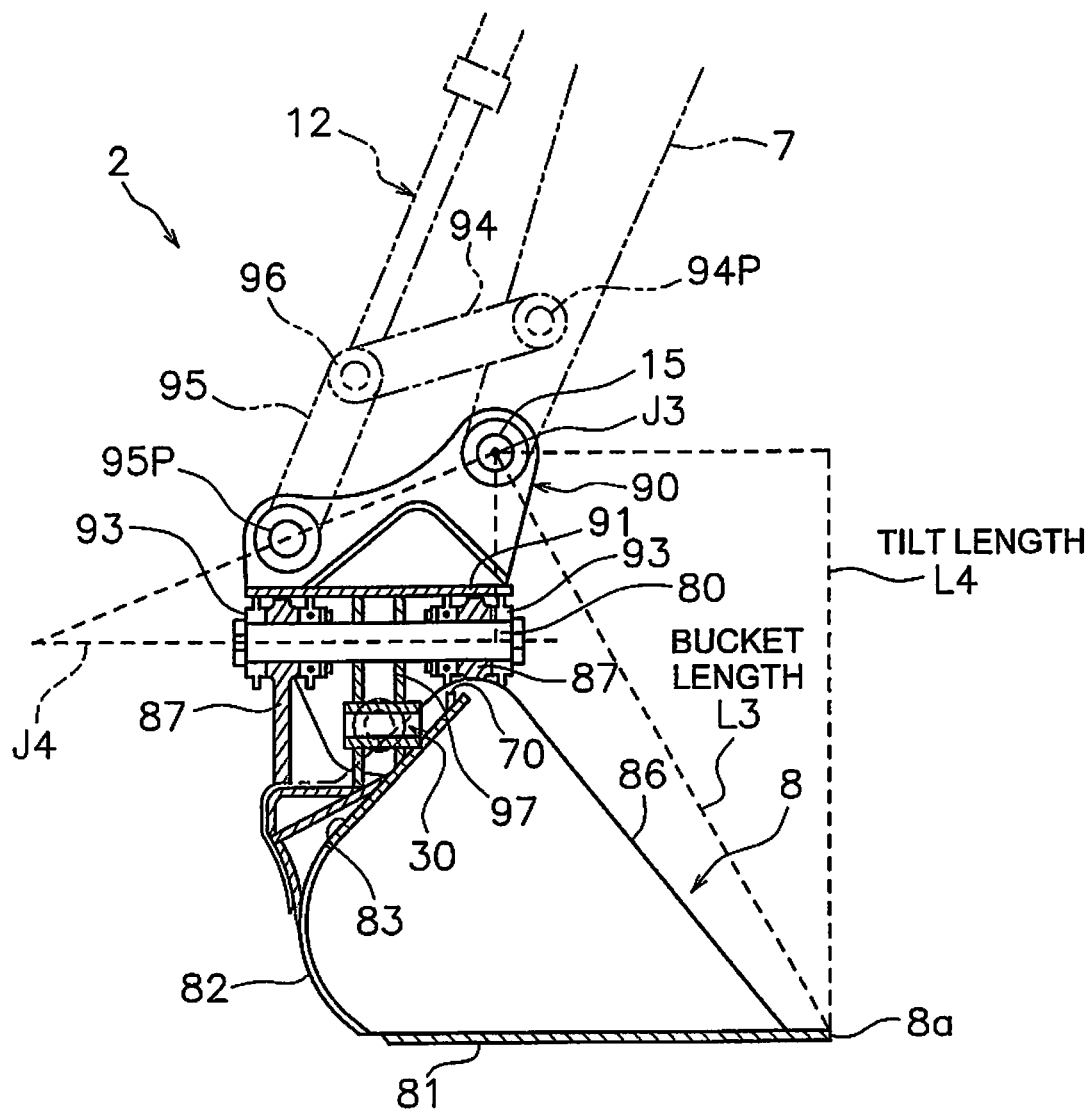
FIG. 2 is a side cross-sectional view illustrating a configuration of the vicinity of a tilt cylinder and a bucket as seen in the radial direction perpendicular to the tilt axis.

The work implement 2 is connected to the revolving superstructure 3. The work implement 2 includes a boom 6, an arm 7, a bucket 8, a boom cylinder 10, an arm cylinder 11, a bucket cylinder 12, and a tilt cylinder 30 (FIGS. 2 and 3).

The boom 6 is connected to the revolving superstructure 3 via a boom pin 13. The arm 7 is connected to the boom 6 via an arm pin 14. The bucket 8 is connected to the arm 7 via a bucket pin 15 and a tilt pin 80. The boom cylinder 10 drives the boom 6. The arm cylinder 11 drives the arm 7. The bucket cylinder 12 and the tilt cylinder 30 drive the bucket 8. The proximal end of the boom 6 is connected to the revolving superstructure 3. The distal end part of the boom 6 is connected to the proximal end part of the arm 7. The distal end part of the arm 7 is connected to the proximal end part of the bucket 8. The boom cylinder 10, the arm cylinder 11, the bucket cylinder 12, and the tilt cylinder 30 are all hydraulic cylinders and are driven by hydraulic fluid.

Figure 3:
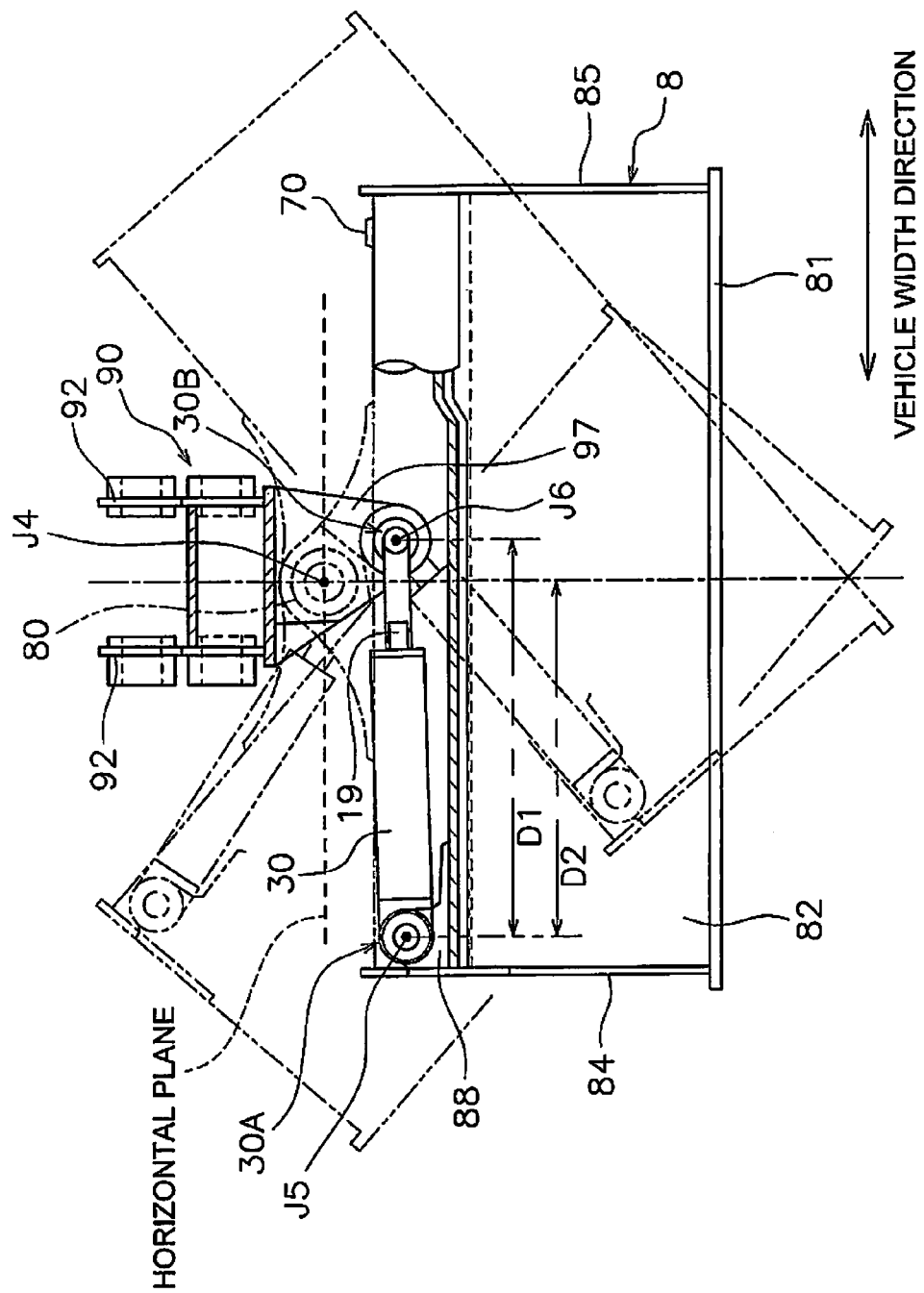
FIG. 3 is a front view illustrating a configuration of the vicinity of the tilt cylinder and the bucket as seen in an axial direction parallel to the tilt axis.

The work implement 2 has a first stroke sensor 16, a second stroke sensor 17, a third stroke sensor 18, and a fourth stroke sensor 19 (FIG. 3). The first stroke sensor 16 is disposed on the boom cylinder 10 and detects a stroke length of the boom cylinder 10 (hereinbelow referred to as "boom cylinder length"). The second stroke sensor 17 is disposed on the arm cylinder 11 and detects a stroke length of the arm cylinder 11 (hereinbelow referred to as "arm cylinder length"). The third stroke sensor 18 is disposed on the bucket cylinder 12 and detects a stroke length of the bucket cylinder 12 (hereinbelow referred to as "bucket cylinder length"). The fourth stroke sensor 19 is disposed on the tilt cylinder 30 and detects a stroke length of the tilt cylinder 30 (hereinbelow referred to as "tilt cylinder length").

The fourth stroke sensor 19 is an example of a "stroke length detecting unit" according to the present exemplary embodiment. The bucket 8, the tilt cylinder 30, and the fourth stroke sensor 19 configure the "bucket device" according to the present exemplary embodiment.

The boom 6 is capable of rotating relative to the revolving superstructure 3 about the center of a boom axis J1 which is a rotating axis. The arm 7 is capable of rotating relative to the boom 6 about the center of an arm axis J2 which is a rotating axis parallel to the boom axis J1. The bucket 8 is capable for rotating relative to the arm 7 about the center of a bucket axis J3 which is a rotating axis parallel to the boom axis J1 and the arm axis J2. The bucket 8 is capable of rotating relative to the arm 7 about the center of a tilt axis J4 which is a rotating axis orthogonal to the bucket axis J3. The boom pin 13 has the boom axis J1. The arm pin 14 has the arm axis J2. The bucket pin 15 has the bucket axis J3. The tilt pin 80 has the tilt axis J4.

The boom axis J1, the arm axis J2, and the bucket axis J3 are all parallel to the Y axis. The tilt axis J4 is perpendicular to the Y axis. The boom 6, the arm 7, and the bucket 8 are all capable of rotating in the θy direction.

Configuration of Bucket 8

A configuration of the bucket 8 will be explained next. FIG. 2 is a side cross-sectional view illustrating a configuration of the vicinity of the tilt cylinder 30 and the bucket 8 as seen in the radial direction perpendicular to the tilt axis J4. FIG. 3 is a front view illustrating a configuration of the vicinity of the tilt cylinder 30 and the bucket 8 as seen in an axial direction parallel to the tilt axis J4.

The bucket 8 disposed at the reference position is depicted in FIG. 2. The bucket 8 disposed in the reference position is depicted with solid lines, and the bucket 8 tilted as far as left and right tilt end positions is depicted with dashed lines in FIG. 3. The reference position of the bucket 8 refers to a position of the bucket 8 while the upper edge or the lower edge of the bucket 8 is parallel to the horizontal plane when the tilt axis J4 is assumed as being included in the horizontal plane. The tilt angle of the bucket 8 is "0 degrees" at the reference position of the bucket 8. The tilt end position signifies the position of the bucket 8 when the bucket 8 is tilted as far as the greatest tilt angle.

The bucket 8 is a tiltable bucket. The work implement 2 has the bucket 8 which is capable of rotating relative to the arm 7 about the center of the bucket axis J3 and the center of the tilt axis J4 which is orthogonal to the bucket axis J3. The bucket 8 is supported by the arm 7 in a rotatable manner about the center of the bucket axis J3 of the bucket pin 15. The bucket 8 is supported by the arm 7 in a rotatable manner about the center of the tilt axis J4 of the tilt pin 80.

The bucket 8 is connected to the distal end part of the arm 7 via a connecting member 90. The bucket pin 15 couples the arm 7 and the connecting member 90. The tilt pin 80 couples the connecting member 90 and the bucket 8. The bucket 8 is connected in a rotatable manner to the arm 7 via the connecting member 90.

The bucket 8 has a bottom plate 81, a back plate 82, an upper plate 83, a side plate 84, and a side plate 85. An opening section 86 of the bucket 8 is formed by the bottom plate 81, the upper plate 83, the side plate 84, and the side plate 85.

The bucket 8 has a bracket 87 provided on an upper part of the upper plate 83. The bracket 87 couples the connecting member 90 and the tilt pin 80.

The connecting member 90 has a plate member 91 and brackets 92 and 93. The bracket 92 is provided on the upper surface of the plate member 91. The bracket 93 is provided on the lower surface of the plate member 91. The bracket 92 couples the arm 7 to a below-mentioned second link member 95. The bracket 93 is disposed on an upper part of the bracket 87 and couples the tilt pin 80 and the bracket 87.

The bucket pin 15 couples the bracket 92 of the connecting member 90 and the distal end part of the arm 7. The tilt pin 80 couples the bracket 93 of the connecting member 90 and the bracket 87 of the bucket 8. As a result, the connecting member 90 and the bucket 8 are capable of rotating about the center of the bucket axis J3 relative to the arm 7, and the bucket 8 is capable of rotating about the center of the tilt axis J4 relative to the connecting member 90.

The work implement 2 has a first link member 94 and the second link member 95. The first link member 94 is connected to the arm 7 in a rotatable manner via a first link pin 94P. The second link member 95 is connected to the bracket 92 in a rotatable manner via a second link pin 95P.

The proximal end part of the first link member 94 is connected to the arm 7 via the first link pin 94P. The proximal end part of the second link member 95 is connected to the bracket 92 via the second link pin 95P. The distal end part of the first link member 94 and the distal end part of the second link member 95 are coupled to each other via a bucket cylinder top pin 96.

The distal end part of the bucket cylinder 12 is connected to the distal end part of the first link member 94 and the distal end part of the second link member 95 in a rotatable manner via the bucket cylinder top pin 96. The connecting member 90 rotates with the bucket 8 about the center of the bucket axis J3 due to the extension and contraction of the bucket cylinder 12. The tilt axis J4 of the tilt pin 80 rotates with the bucket 8 about the center of the bucket axis J3 due to the rotation of the bucket 8 about the center of the bucket axis J3.

The tilt cylinder 30 is coupled to the bucket 8 and the connecting member 90 as illustrated in FIG. 3. A first end part 30A of the tilt cylinder 30 is coupled in a rotatable manner to a bracket 88 provided on the bucket 8. The first end part 30A is capable of rotating about the center of a first cylinder rotating axis J5. The first end part 30A is the distal end part of the cylinder body of the tilt cylinder 30. The bracket 88 is disposed in a position away from the tilt axis J4 in the vehicle width direction. The bracket 88 is disposed at an upper end part of the bucket 8 in the vehicle width direction. A second end part 30B of the tilt cylinder 30 is connected in a rotatable manner to a bracket 97 provided on the connecting member 90. The second end part 30B is capable of rotating about the center of a second cylinder rotating axis J6. The bracket 97 is provided on the lower surface of the plate member 91. The bracket 97 is formed in a substantially triangular shape as seen in a front view.

The first end part 30A of the tilt cylinder 30 is positioned between the tilt axis J4 and the bucket 8 when the bucket 8 is disposed in the reference position. That is, the first end part 30A is positioned on the same side as the bucket 8 relative to the horizontal plane (XgYg plane) passing through the tilt axis J4. The first end part 30A is spaced away from the tilt axis J4 in the vehicle width direction.

Further, the second end part 30B of the tilt cylinder 30 is positioned between the tilt axis J4 and the bucket 8 when the bucket 8 is disposed in the reference position. That is, the second end part 30B is positioned on the same side as the bucket 8 relative to the horizontal plane passing through the tilt axis J4. The second end part 30B is spaced away from the tilt axis J4 in the vehicle width direction. As a result, an interval D1 between the first end part 30A and the second end part 30B is greater than an interval D2 between the first end part 30A and the tilt axis J4. Consequently, the stroke length of the tilt cylinder 30 can be longer per unit of tilt angle of the bucket 8 in comparison to when the interval D1 is smaller than the interval D2.

Posture of Hydraulic Excavator CM

Figure 4:
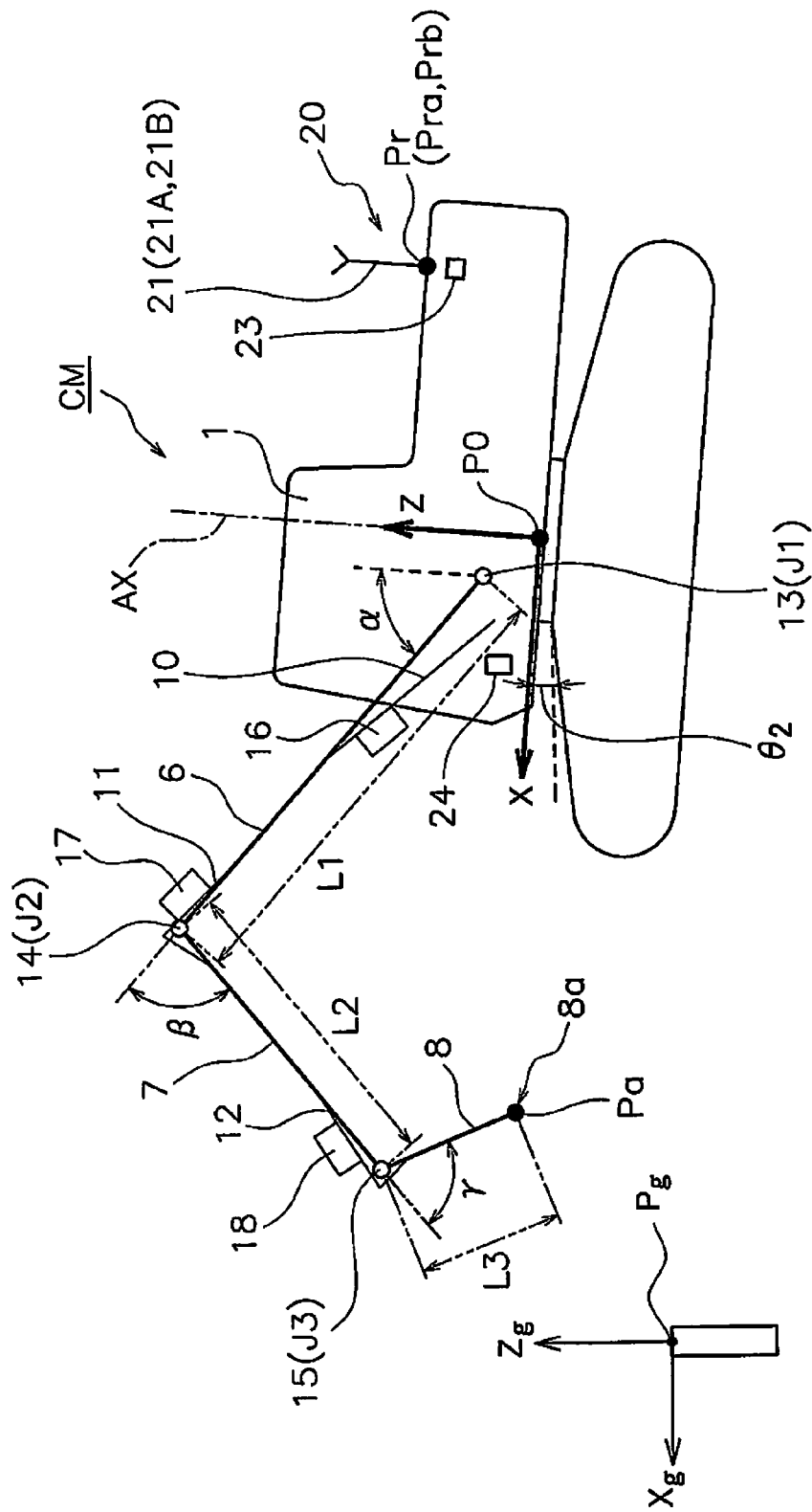
FIG. 4 is a side view schematically illustrating the hydraulic excavator.
Figure 5:
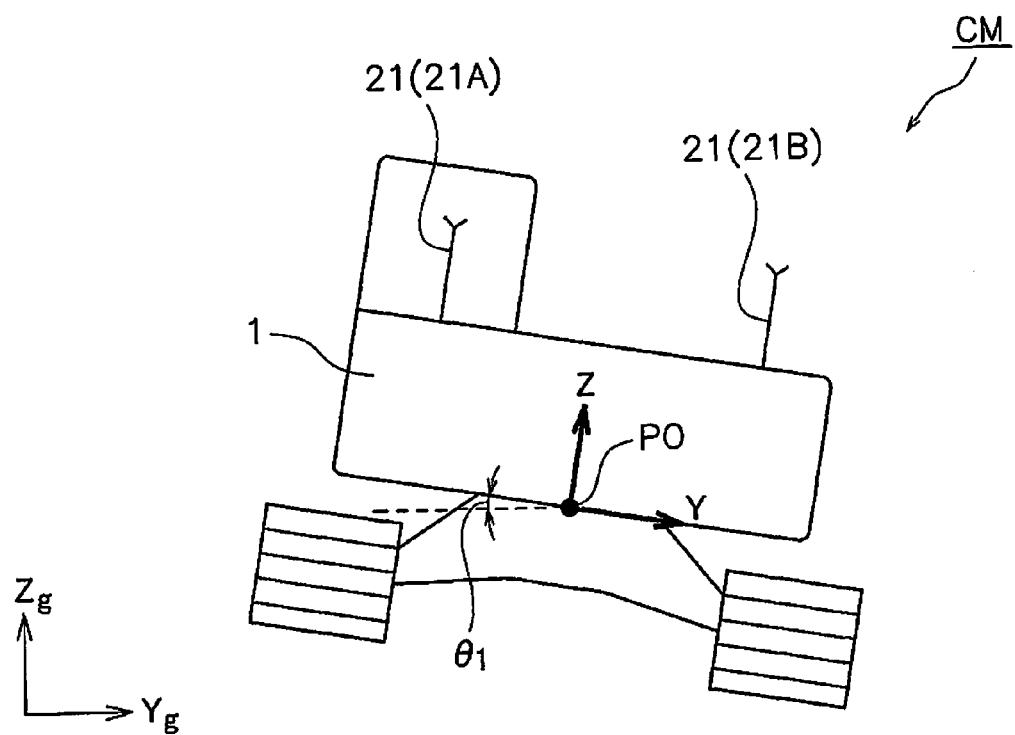
FIG. 5 is a rear view schematically illustrating the hydraulic excavator.
Figure 6:
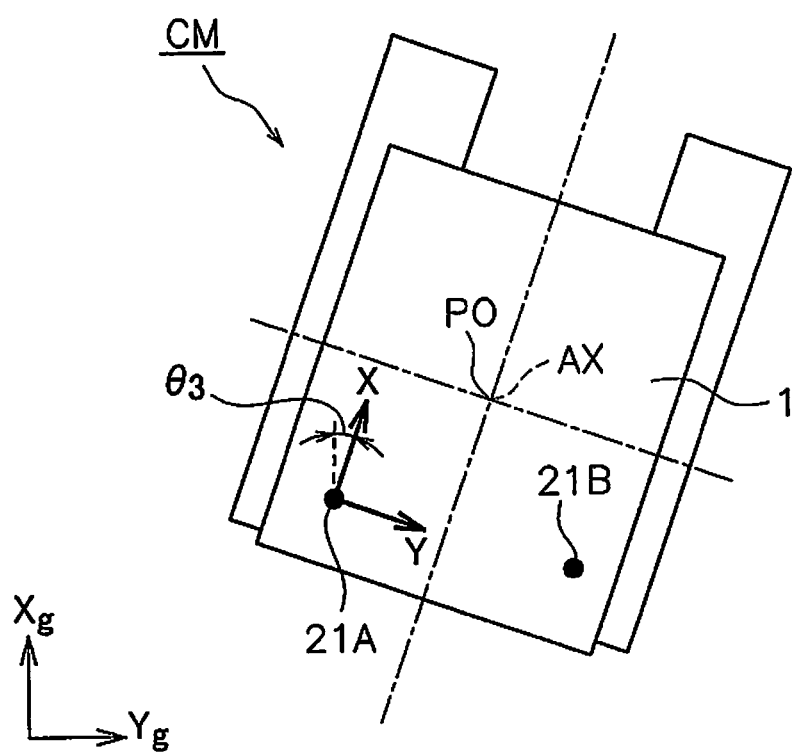
FIG. 6 is a plan view schematically illustrating the hydraulic excavator.

FIG. 4 is a side view schematically illustrating the hydraulic excavator. FIG. 5 is a rear view schematically illustrating the hydraulic excavator. FIG. 6 is a plan view schematically illustrating the hydraulic excavator.

In the following explanation, a boom length L1 is the distance between the boom axis J1 and the arm axis J2, an arm length L2 is the distance between the arm axis J2 and the bucket axis J3, and a bucket length L3 is the distance between the bucket axis J3 and a distal end part 8a of the bucket 8. The distal end part 8a of the bucket 8 is the blade tip of the bucket 8.

The hydraulic excavator CM is provided with a position detection device 20. The position detection device 20 detects vehicle body position data P which indicates the current position of the vehicle body 1, and vehicle body posture data Q which indicates the posture of the vehicle body 1. The vehicle body position data P includes information that indicates the current position (Xg position, Yg position, and Zg position) of the vehicle body 1 in the global coordinate system. The vehicle body posture data Q includes position information of the revolving superstructure 3 pertaining to the θXg direction, the θYg direction, and the θZg direction.

The vehicle body posture data Q includes an inclination angle (roll angle) θ1 in the left-right direction of the revolving superstructure 3 relative to the horizontal plane (XgXy plane), an inclination angle (pitch angle) θ2 in the front-back direction of the revolving superstructure 3 relative to the horizontal plane, and an inclination angle (yaw angle) θ3 formed by a reference azimuth (e.g., north) in the global coordinates and the azimuth in which the revolving superstructure 3 (work implement 2) is facing.

The position detection device 20 has an antenna 21, a position sensor 23, and an inclination sensor 24. The antenna 21 is an antenna for detecting the current position of the vehicle body 1. The antenna 21 is an antenna for a global navigation satellite system (GNSS). The antenna 21 outputs a signal corresponding to a received radio wave (GNSS radio wave) to the position sensor 23.

The position sensor 23 includes a three-dimensional position sensor and a global coordinate computing unit. The position sensor 23 detects an installation position Pr of the antenna 21 in the global coordinate system. The global coordinate computing unit calculates the vehicle body position data P indicating the current position of the vehicle body 1, on the basis of the installation position Pr of the antenna in the global coordinate system. The global coordinate system is a three-dimensional coordinate system based on a reference position Pg installed in the work area. As illustrated in FIG. 4, the reference position Pg is a position at the distal end of a reference marker set in the work area.

The inclination sensor 24 is provided on the revolving superstructure 3. The inclination sensor 24 has an inertial measurement unit (IMU). The position detection device 20 uses the inclination sensor 24 to obtain the vehicle body posture data Q which includes the roll angle θ1 and the pitch angle θ2.

Figure 7:
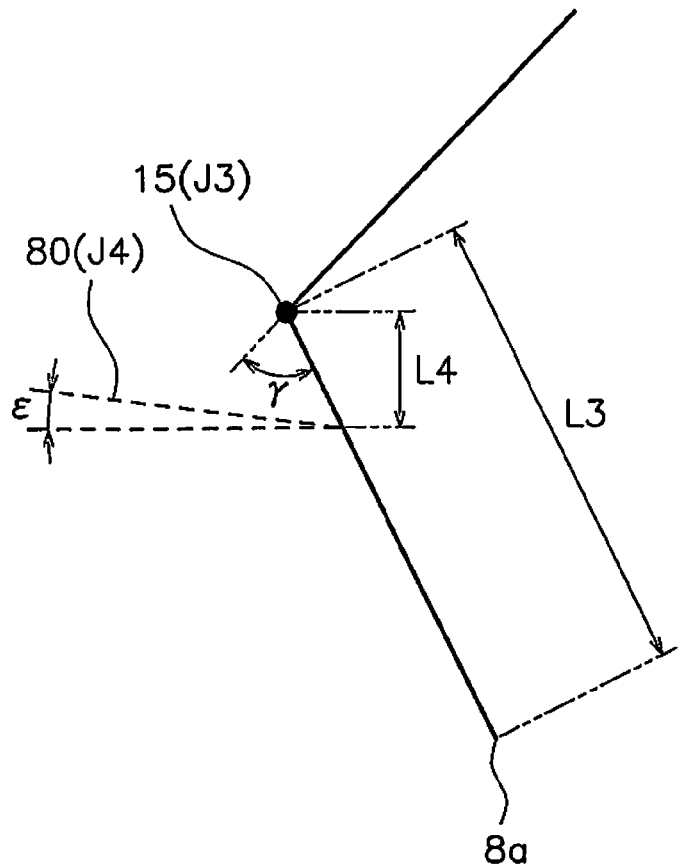
FIG. 7 is a side view schematically illustrating the bucket.
Figure 8:
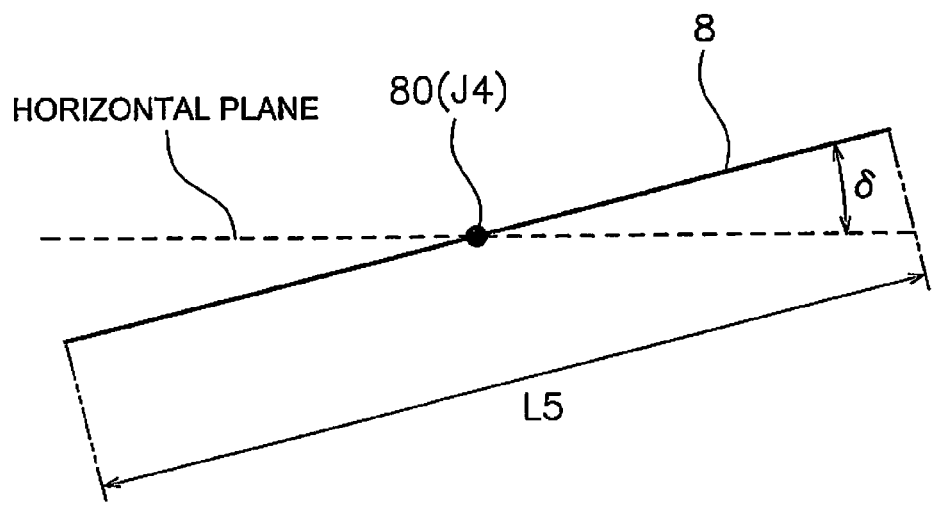
FIG. 8 is a front view schematically illustrating the bucket.

FIG. 7 is a side view schematically illustrating the bucket 8. FIG. 8 is a front view schematically illustrating the bucket 8.

In the following explanation, a tilt length L4 is the distance between the bucket axis J3 and the tilt axis J4, and a width L5 of the bucket 8 is the distance between the side plate 84 and the side plate 85.

A tilt angle δ is the rotation angle of the bucket 8 about the center of the tilt axis and is the rotation angle of the bucket 8 relative to the XY plane in the local coordinate system. A method for obtaining the tilt angle δ is described below. A tilt axis angle ε is the inclination angle of the tilt axis J4 relative to the XY plane in the local coordinate system. The inclination angle (tilt axis absolute angle) of the tilt axis J4 relative to the horizontal plane in the global coordinate system is calculated by a below-mentioned sensor controller 32.

Configuration of Control System 200

Figure 9:
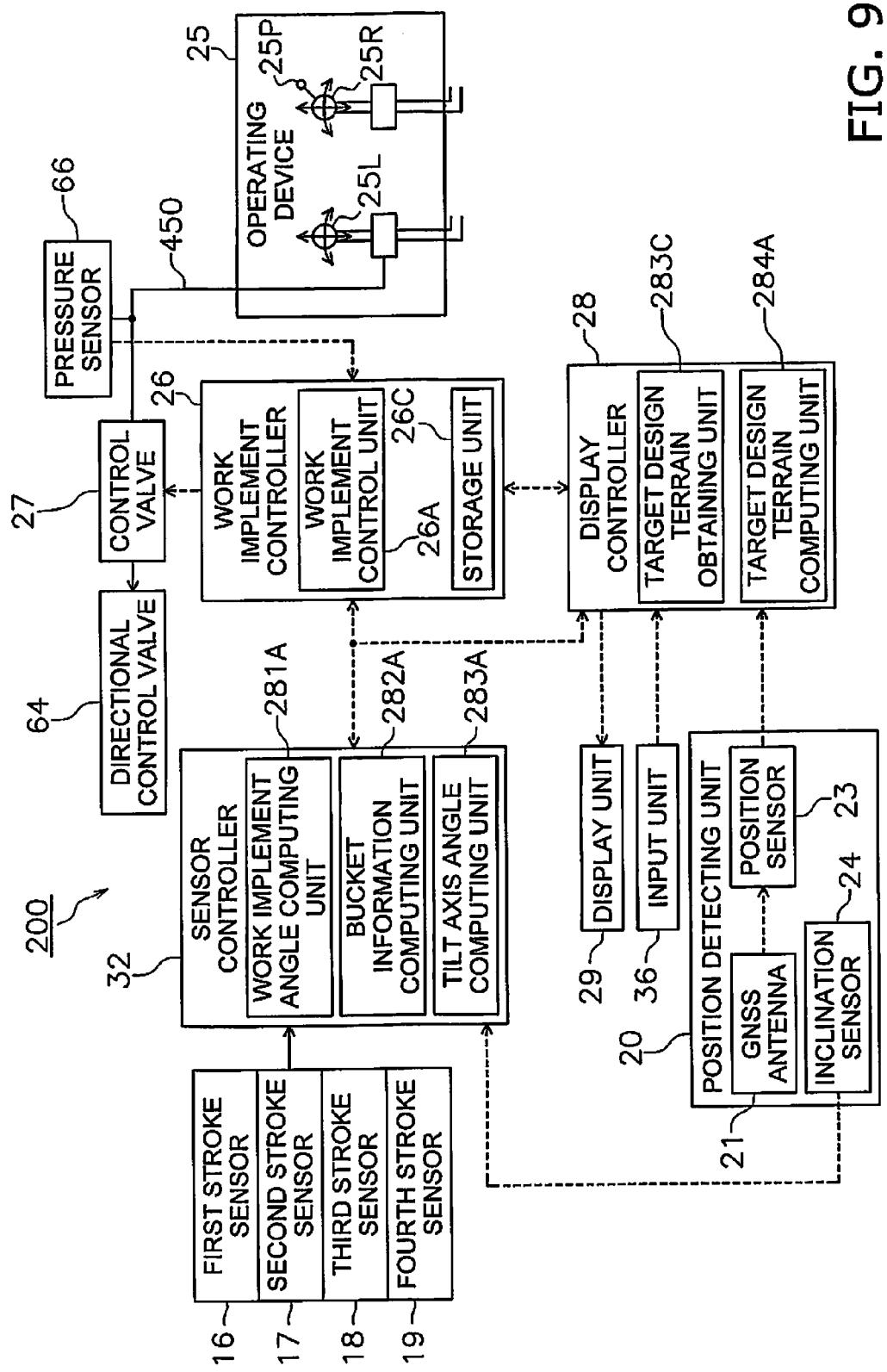
FIG. 9 is a block diagram illustrating a functional configuration of a control system.

FIG. 9 is a block diagram illustrating the functional configuration of the control system 200 mounted on the hydraulic excavator CM.

The control system 200 is provided with the position detection device 20, an operating device 25, a work implement controller 26, a pressure sensor 66, a control valve 27, a directional control valve 64, a display controller 28, a display unit 29, an input unit 36, and the sensor controller 32.

The input unit 36 receives an input operation from the operator. A touch panel on the display unit 29 and the like may be used as the input unit 36. The input unit 36 creates an operation signal based on the input operation from the operator and outputs the operation signal to the display controller 28.

The operating device 25 is disposed in the cab 4. The operating device 25 is operated by the operator. The operating device 25 receives operator operations for driving the work implement 2. The operating device 25 is a pilot hydraulic pressure type of operating device. The operating device 25 has a first operating lever 25R, a second operating lever 25L, and a third operating lever 25P.

The first operating lever 25R is disposed on the right side of the operator's seat 4S for example. The second operating lever 25L is disposed on the left side of the operator's seat 4S for example. The third operating lever 25P is disposed on the first operating lever 25R for example. The third operating lever 25P may be disposed on the second operating lever 25L. The back and forth, left and right motions of the first operating lever 25R and the second operating lever 25L correspond to motions in two axes.

The boom 6 and the bucket 8 are operated by the first operating lever 25R. A front-back direction operation of the first operating lever 25R corresponds to an operation of the boom 6, and up and down motions of the boom 6 are executed in response to the front-back direction operations. The left-right direction operation of the first operating lever 25R corresponds to an operation of the bucket 8, and excavating and releasing motions of the bucket 8 are executed in response to the left-right direction operations. Rotation of the bucket 8 about the center of the bucket axis J3 is operated by left-right direction operations of the first operating lever 25R.

The arm 7 and the revolving superstructure 3 are operated by the second operating lever 25L. An operation of the second operating lever 25L in the front-back direction corresponds to an operation of the arm 7, and releasing and excavating motions of the arm 7 are executed in response to the front-back direction operations. An operation of the second operating lever 25L in the left-right direction corresponds to the revolving of the revolving superstructure 3 and clockwise and anticlockwise revolving motions of the revolving superstructure 3 are executed in response to the left-right direction operations.

The tilting motion of the bucket 8 about the center of the tilt axis J4 is operated with the third operating lever 25P.

Pilot hydraulic pressure of a pilot hydraulic pressure line 450 is adjusted in response to the operation amount of the operating device 25 and as a result the directional control valve 64 is driven. The directional control valve 64 adjusts the amount of hydraulic fluid supplied to the hydraulic cylinders (the boom cylinder 10, the arm cylinder 11, the bucket cylinder 12, and the tilt cylinder 30). The pressure sensor 66 for detecting the pilot hydraulic pressure is disposed on the pilot hydraulic pressure line 450. The detection result of the pressure sensor 66 is outputted to the work implement controller 26. The control valve 27 is an electromagnetic proportional control valve. The control valve 27 adjusts the pilot hydraulic pressure on the basis of a control signal from the work implement controller 26.

The sensor controller 32 has a work implement angle computing unit 281A, a bucket information computing unit 282A, and a tilt axis angle computing unit 283A.

The work implement angle computing unit 281A calculates a rotation angle $\alpha$ of the boom 6 relative to the vertical direction of the vehicle body 1 from the boom cylinder length obtained on the basis of the detection results from the first stroke sensor 16. The work implement angle computing unit 281A calculates a rotation angle $\beta$ of the arm 7 relative to the boom 6 based on the arm cylinder length obtained on the basis of the detection results from the second stroke sensor 17. The work implement angle computing unit 281A calculates a rotation angle $\gamma$ of the bucket 8 relative to the arm 7 based on the bucket cylinder length obtained on the basis of the detection results from the third stroke sensor 18.

The bucket information computing unit 282A calculates the tilt angle $\delta$ of the bucket 8 relative to the XY plane in the local coordinate system based on the tilt cylinder length obtained on the basis of the detection results from the fourth stroke sensor 19.

Figure 10:
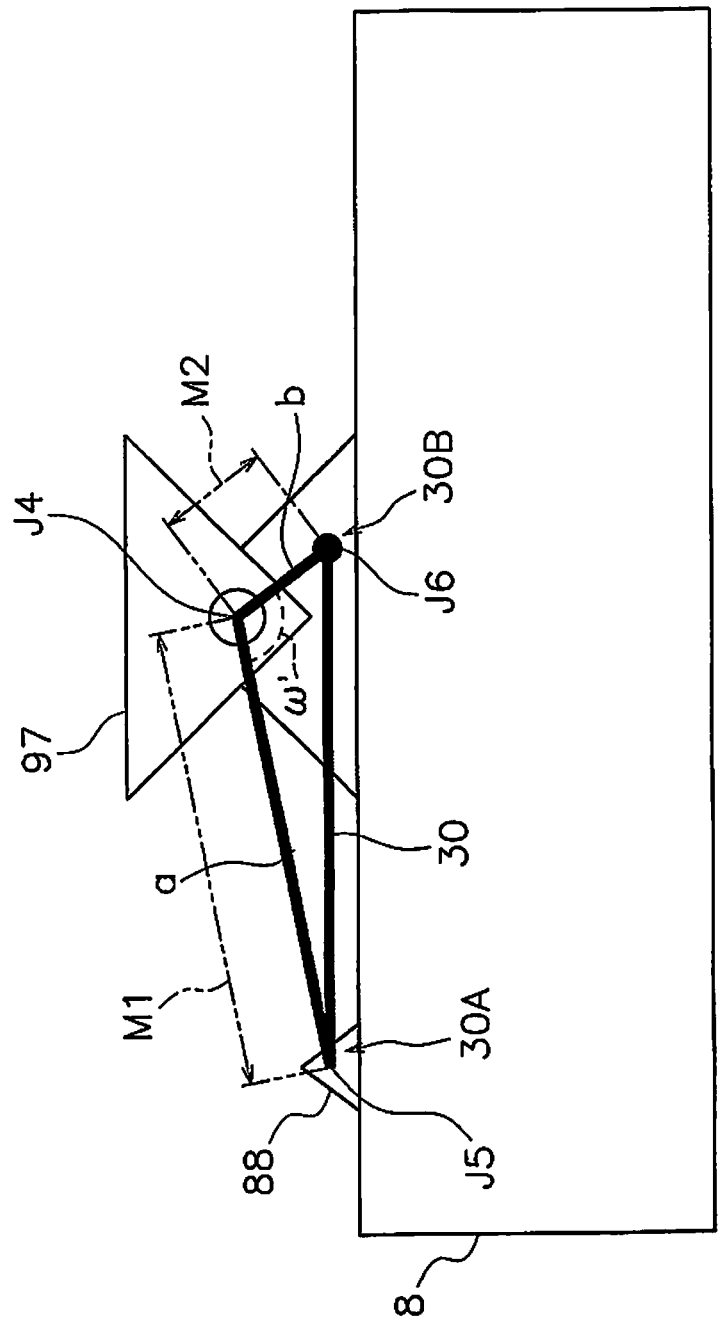
FIG. 10 is a schematic view for explaining a method for obtaining a tilt angle in which a bucket is in a reference position.
Figure 11:
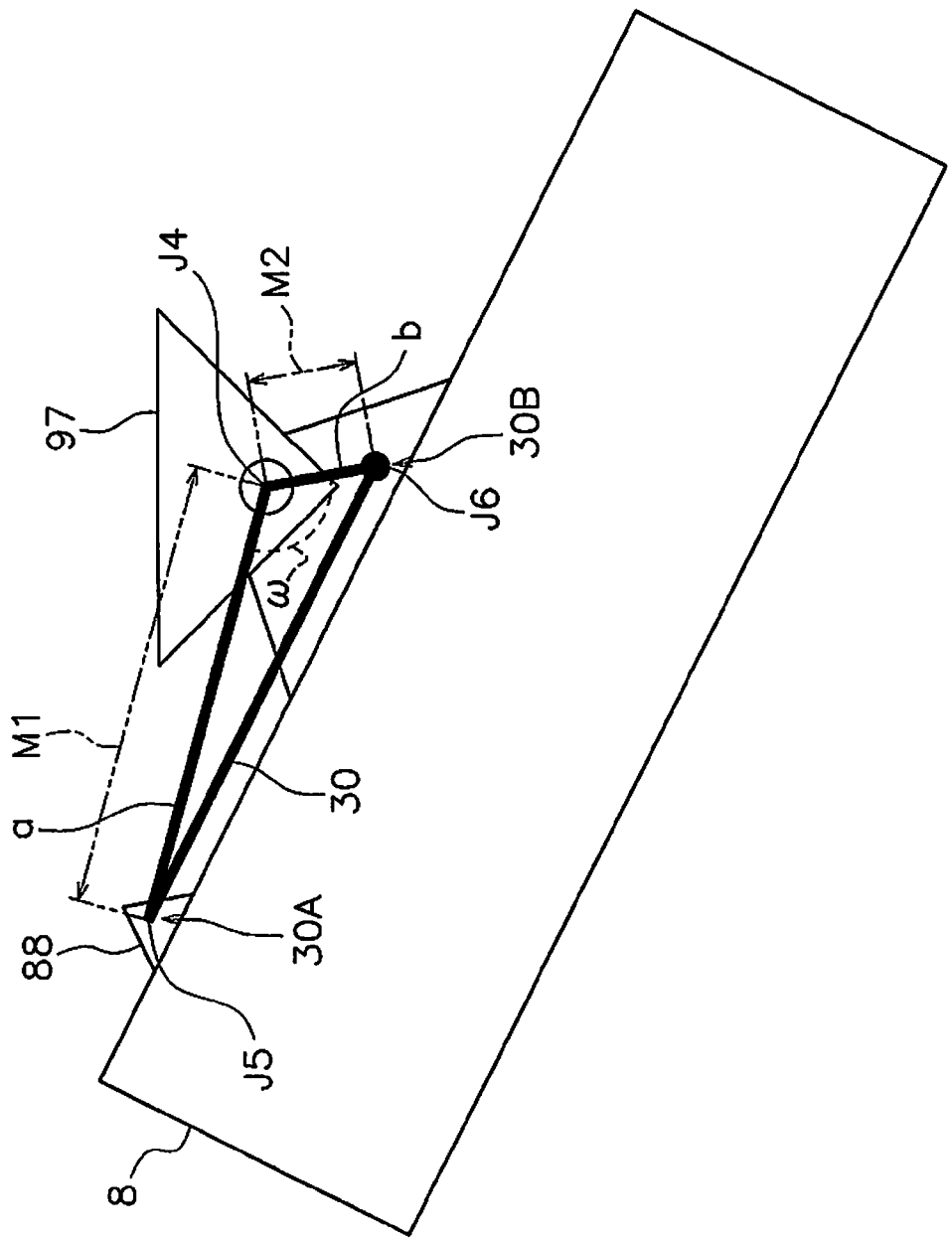
FIG. 11 is a schematic view for explaining a method for obtaining the tilt angle in which a bucket is in a tilted position.

FIGS. 10 and 11 are schematic views for explaining a method for calculating the tilt angle $\delta$ carried out by the bucket information computing unit 282A. The bucket 8 in the reference position is depicted in FIG. 10 and the tilted bucket 8 is depicted in FIG. 11.

The bucket information computing unit 282A stores a length M1 of a first line segment "a" linking the first end part 30A and the tilt axis J4 of the tilt cylinder 30, and a length M2 of a second segment "b" linking the second end part 30B and the tilt axis J4 of the tilt cylinder 30. The length M1 of the first line segment "a" is the straight line distance between the first cylinder rotating axis J5 and the tilt axis J4. The length M2 of the second segment "b" is the straight line distance between the second cylinder rotating axis J6 and the tilt axis J4. Moreover, the bucket information computing unit 282A stores a reference angle $\omega'$ (see FIG. 10) formed by the first line segment "a" and the second segment "b" when the bucket 8 is disposed at the reference position.

The bucket information computing unit 282A calculates the tilt cylinder length on the basis of the detection results from the fourth stroke sensor 19. The bucket information computing unit 282A uses the law of cosines to calculate an inclination angle $\omega$ (see FIG. 11) based on the length M1 of the first line segment "a", the length M2 of the second segment "b", and the tilt cylinder length. The bucket information computing unit 282A obtains a differential value between the inclination angle $\omega$ and the reference angle $\omega'$ as the tilt angle $\delta$. When the bucket 8 is disposed in the reference position as illustrated in FIG. 10, the tilt angle is "0 degrees" because the inclination angle $\omega$ and the reference angle $\omega'$ match.

The bucket information computing unit 282A creates bucket data R which indicates the shape and position of the bucket 8 in the plane of motion of the work implement 2 on the basis of the rotation angles $\alpha$, to $\gamma$ calculated by the work implement angle computing unit 281A, the vehicle body posture data Q obtained by the inclination sensor 24, and the tilt angle $\delta$.

The tilt axis angle computing unit 283A calculates the angle (tilt axis absolute angle) of the tilt axis J4 relative to the horizontal plane on the basis of the rotation angles $\alpha$ to $\gamma$ and the vehicle body posture data Q. Specifically, the tilt axis angle computing unit 283A calculates the angle (tilt axis angle $\epsilon$) of the tilt axis J4 in the local coordinate system on the basis of the rotation angles $\alpha$ to $\gamma$ and calculates the tilt axis absolute angle in the global coordinate system on the basis of the tilt axis angle $\epsilon$ and the vehicle body posture data Q.

The sensor controller 32 outputs the rotation angles $\alpha$ to $\gamma$, the tilt axis angle $\epsilon$, the tilt axis absolute angle, and the bucket data R to the display controller 28 and the work implement controller 26.

The display controller 28 obtains the vehicle body position data P and the vehicle body posture data Q from the position detection device 20. The display controller 28 obtains the bucket data R from the sensor controller 32. The display controller 28 has a target design terrain obtaining unit 283C and a target design terrain computing unit 284A.

The target design terrain obtaining unit 283C stores target construction information (three-dimensional target design terrain data S) which indicates a stereoscopic design terrain that is a three-dimensional target design terrain of the excavation object. The three-dimensional target design terrain data S includes coordinate data and angle data of the target design terrain required for creating target design terrain data T. However, the three-dimensional target design terrain data S may be inputted to the display controller 28 via a wireless communication device for example, or may be inputted to the display controller 28 from an external memory and the like.

The target design terrain computing unit 284A creates the target design terrain data T which indicates a target design terrain that is a two-dimensional target shape of the excavation object in the plane of motion of the work implement 2, on the basis of the vehicle body position data P, the vehicle body posture data Q, the bucket data R, and the three-dimensional target design terrain data S.

The display controller 28 outputs the target design terrain data T to the work implement controller 26. The display controller 28 causes the target design terrain to be displayed on the display unit 29 on the basis of the target design terrain data T created by the target design terrain computing unit 284A. Moreover, the display controller 28 causes the posture of the hydraulic excavator CM relative to the target design terrain to be displayed on the display unit 29 on the basis of the bucket data R. The display controller 28 updates the posture of the hydraulic excavator CM displayed on the display unit 29 each time the bucket data R is updated. The posture of the bucket, the posture of the work implement, and the posture of the vehicle body are included in the posture of the hydraulic excavator CM created by the display controller 28.

The display controller 28 is able to calculate the positions in the local coordinates when seen under the global coordinate system on the basis of the vehicle body position data P, the vehicle body posture data Q, and the bucket data R. The display controller 28 converts the target design terrain data T outputted to the work implement controller 26 to local coordinates but other computations are carried out under the global coordinate system.

The display unit 29 is a monitor for example. For example, the target design terrain and the posture of the hydraulic excavator CM relative thereto are displayed in the display unit 29. The display unit 29 includes a human machine interface (HMI) monitor as a guidance monitor for computer-aided construction.

Figure 12:
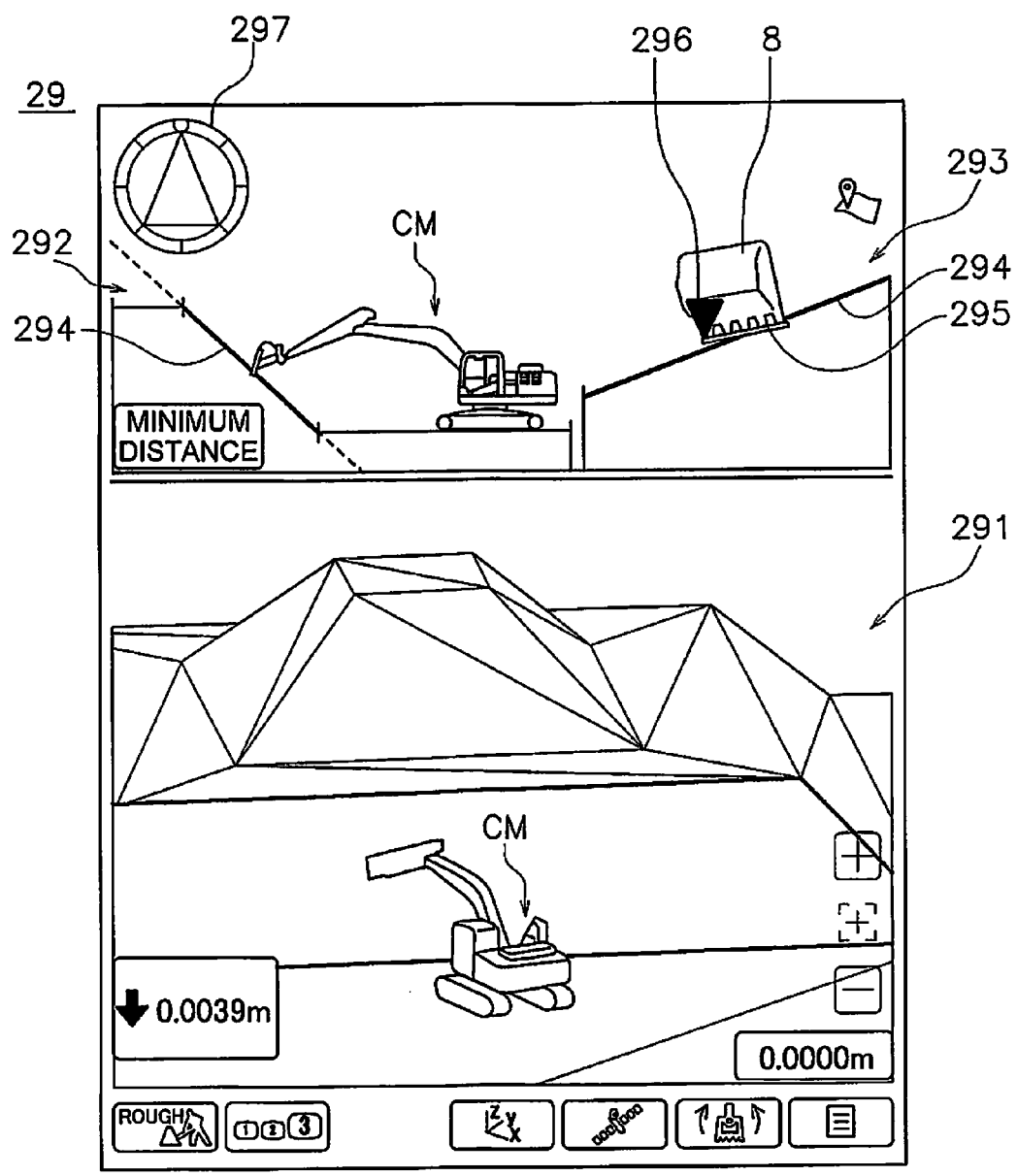
FIG. 12 is a view illustrating a display example of a display unit.

FIG. 12 is a view for illustrating a display example of the display unit 29 according to the display controller 28. As illustrated in FIG. 12, the display controller 28 displays an oblique view region 291, a side surface view region 292, and a bucket posture display region 293 on the display unit 29. The display controller 28 displays the hydraulic excavator CM on the target design terrain in the oblique view region 291. The display controller 28 displays the hydraulic excavator CM facing a line of intersection 294 of the plane of motion of the work implement 2 and the target design terrain in the side surface view region 292. The display controller 28 displays the posture of the bucket 8 facing the line of intersection 294, a blade tip line 295, and an arrow 296 in the bucket posture display region 293. The blade tip line 295 schematically displays the blade tip 8a of the bucket 8. The arrow 296 schematically displays the component of the bucket 8 nearest the line of intersection 294.

The display controller 28 changes the posture of the bucket 8 in the bucket posture display region 293 each time the tilt angle δ is updated. At this time, the display controller 28 may change the shape of the bucket 8 so that the posture of the bucket 8 is consistent. The display controller 28 changes the colors of the line of intersection 294 and a facing angle compass 297 when the bucket 8 faces the line of intersection 294. The facing angle compass 297 displays the angle of the blade tip 8a of the bucket 8 relative to the target design terrain.

The work implement controller 26 has a work implement control unit 26A and a storage unit 26C. The work implement control unit 26A controls the motions of the work implement 2 by creating controls commands to the control valve 27 on the basis of the target design terrain data T and the bucket data R obtained from the display controller 28. The work implement control unit 26A executes, for example, a limitation excavation control for automatically controlling at least a portion of the motions of the work implement 2. Specifically, the work implement control unit 26A determines a limit velocity in response to the distance of the bucket 8 from the target design terrain, and controls the work implement 2 so that the velocity in the direction of the work implement 2 approaching the target design terrain is equal to or less than the limit velocity. Consequently, the position of the bucket 8 relative to the target design terrain is controlled and the bucket 8 is suppressed from intruding into the target design terrain. The work implement control unit 26A may automatically control a portion of grading work for moving the bucket 8 along the target design terrain.

Various types of programs and data required for the work implement control unit 26A to control the motions of the work implement are stored in the storage unit 26C.

Method for Obtaining Tilt Angle δ

Figure 13:
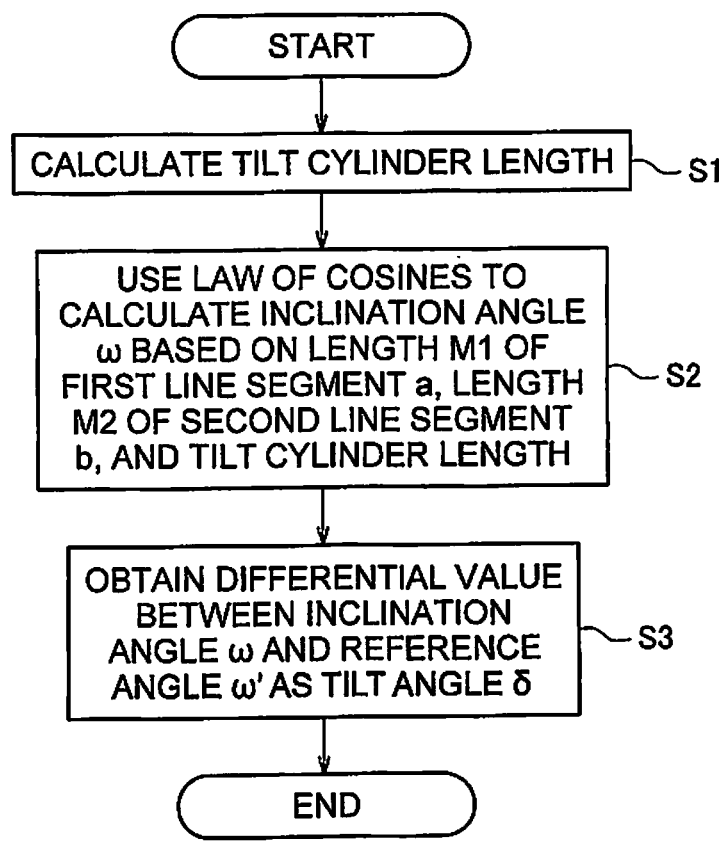
FIG. 13 is a flow diagram for explaining a method for obtaining the tilt angle.

A method for obtaining the tilt angle δ by the control system 200 will be explained with reference to the drawings. FIG. 13 is a flow diagram for explaining a method for obtaining the tilt angle δ.

In step S1, the bucket information computing unit 282A calculates the tilt cylinder length of the tilt cylinder 30 on the basis of the detection results from the fourth stroke sensor 19.

In step S2, the bucket information computing unit 282A uses the law of cosines to calculate the inclination angle ω (see FIG. 11) based on the length M1 of the first line segment "a", the length M2 of the second segment "b", and the tilt cylinder length.

In step S3, the bucket information computing unit 282A obtains a differential value between the inclination angle ω and the reference angle ω' (see FIG. 10) as the tilt angle δ.

The hydraulic excavator CM (example of a work vehicle) is equipped with the bucket 8, the tilt cylinder 30, the fourth stroke sensor 19 (example of a stroke length detecting unit), and the bucket information computing unit 282A. The bucket 8 is able to rotate about the center of the tilt axis J4. The tilt cylinder 30 causes the bucket 8 to rotate about the center of the tilt axis J4. The fourth stroke sensor 19 detects the stroke length of the tilt cylinder 30. The bucket information computing unit 282A obtains the tilt angle δ of the bucket 8 on the basis of the stroke length detected by the fourth stroke sensor 19. The tilt angle δ is the differential value between the predetermined reference angle ω' and the inclination angle ω formed by the first line segment "a" that links the first end part 30A and the tilt axis J4 of the tilt cylinder 30 and the second segment "b" that links the second end part 30B and the tilt axis J4 of the tilt cylinder 30 when viewing the tilt cylinder 30 from an axial direction parallel to the tilt axis J4.

In this way, the bucket information computing unit 282A is able to obtain the tilt angle δ of the bucket 8 from the law of cosines by using the stroke length of the tilt cylinder 30 detected by the fourth stroke sensor 19. Therefore, the tilt angle δ can be obtained accurately regardless of the posture of the hydraulic excavator CM.

The bucket information computing unit 282A detects the position of the bucket 8 on the basis of the tilt angle δ. Therefore, the position of the bucket 8 can be specified accurately.

The display controller 28 of the hydraulic excavator CM causes the display unit 29 to display the bucket 8 on the basis of the tilt angle δ. Therefore, the posture of the bucket 8 can be displayed with accuracy on the display unit 29.

The first end part 30A of the tilt cylinder 30 is coupled to the bucket 8. A second end part 30B of the tilt cylinder 30 is positioned between the tilt axis J4 and the bucket 8 when viewing the tilt cylinder 30 in the axial direction of the tilt axis J4. The interval D1 between the first end part 30A and the second end part 30B is greater than the interval D2 between the first end part 30A and the tilt axis J4 in the horizontal direction. Consequently, the stroke length of the tilt cylinder 30 can be longer per unit of tilt angle of the bucket 8 in comparison to when the interval D1 is smaller than the interval D2. As a result, the tilt angle δ can be obtained with greater accuracy because the inclination angle ω can be calculated accurately.

Although an exemplary embodiment of the present invention has been described so far, the present invention is not limited to the above exemplary embodiments and various modifications may be made within the scope of the invention.

Figure 14:
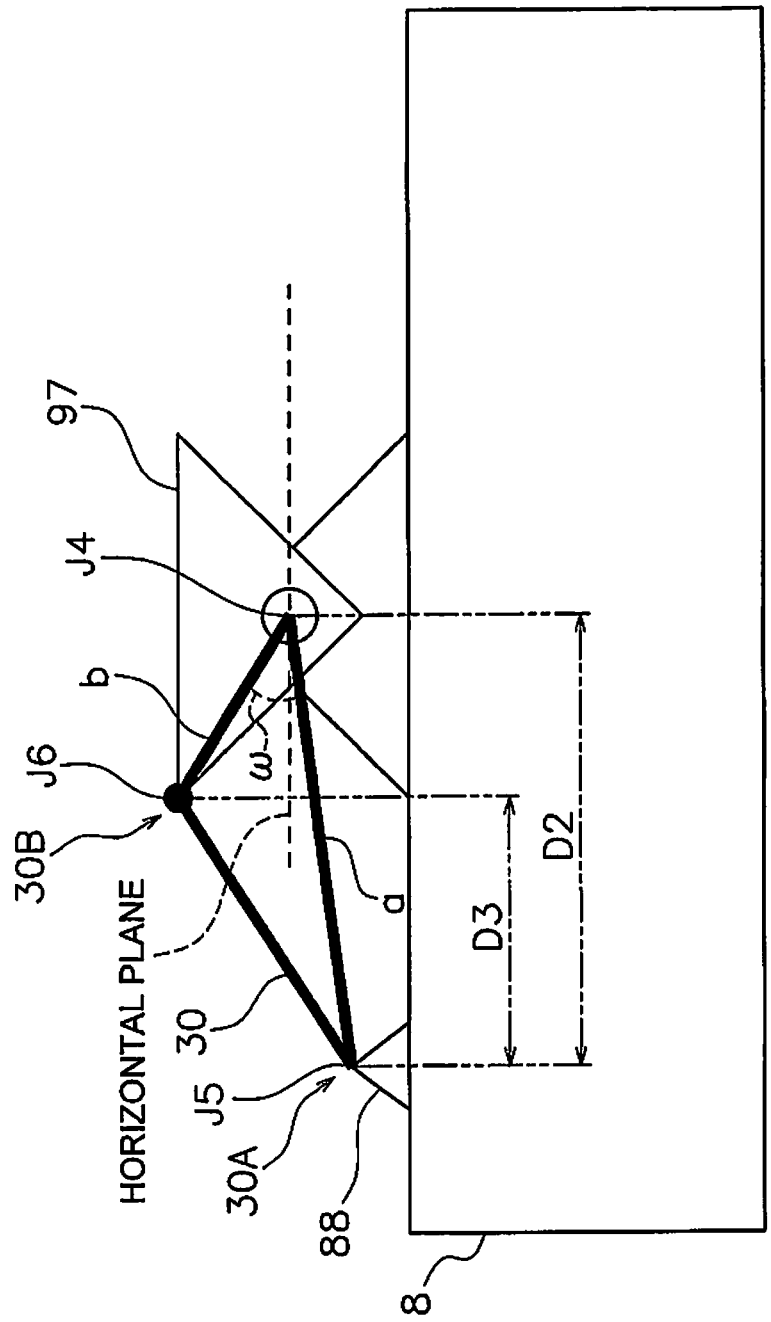
FIG. 14 is a side view schematically illustrating the bucket.

While the second end part 30B of the tilt cylinder 30 is positioned between the tilt axis J4 and the bucket 8 as illustrated in FIG. 10 in the above exemplary embodiment, the second end part 30B may be positioned on the opposite side of the bucket 8 relative to the horizontal plane (XgYg plane) that passes through the tilt axis J4 as illustrated in FIG. 14. In this case, an interval D3 between the first end part 30A and the second end part 30B in the horizontal direction may be smaller than the interval D2 between the first end part 30A and the tilt axis J4 or may be equal to or greater than the interval D2 between the first end part 30A and the tilt axis J4. The interval D2 is a horizontal component (length in the horizontal direction) of the first line segment "a" that links the first end part 30A and the tilt axis J4.

While the interval D1 between the first end part 30A and the second end part 30B is greater than the interval D2 between the first end part 30A and the tilt axis J4 as illustrated in FIG. 11 in the above embodiment, the interval D1 may be the same as the interval D2 or may be smaller than the interval D2.

While the bucket information computing unit 282A calculates the tilt angle δ of the bucket 8 from the law of cosines by using the length of the tilt cylinder based on the detection results from the fourth stroke sensor 19 in the above exemplary embodiment, the tilt angle δ may be obtained by referring to a table associating tilt cylinder lengths with tilt angles δ. In this case, the calculation of the tilt angle S using the law of cosines is not necessary and arithmetic operations by the bucket information computing unit 282A can be reduced.

While the rotation angle α of the boom 6, the rotation angle β of the arm 7, and the rotation angle γ of the bucket 8 are detected by stroke sensors in the above embodiment, the rotation angles may be detected by an angle detecting instrument such as a rotary encoder and the like.

While an example of the hydraulic excavator CM is used as the work vehicle, the above exemplary embodiments may also be applied to another work vehicle such as a bulldozer or a wheel loader.

The exemplary embodiments of the present invention are useful in the field of work vehicles because the tilt angle can be obtained with greater accuracy.

What is claimed is:

1. A work vehicle comprising:
a bucket configured to rotate about a tilt axis;
a tilt cylinder configured to cause the bucket to rotate about the tilt axis;
a stroke length detecting unit configured to detect a stroke length of the tilt cylinder; and
a bucket information computing unit configured to obtain a tilt angle of the bucket on the basis of the stroke length detected by the stroke length detecting unit,
the bucket information computing unit calculating an angle formed by a first line segment and a second line segment when viewing the tilt cylinder from an axial direction of the tilt axis, the first line segment linking a first end part and the tilt axis of the tilt cylinder, the second line segment linking a second end part and the tilt axis of the tilt cylinder,
the bucket information computing unit using the formed angle to calculate the tilt angle.

2. The work vehicle according to claim 1, wherein
the bucket information computing unit calculates a difference between the formed angle and a reference angle at a reference position of the bucket as the tilt angle.

3. The work vehicle according to claim 2, wherein
the bucket information computing unit specifies a position of the bucket on the basis of the tilt angle.

4. The work vehicle according to claim 3, further comprising
a display unit configured to display the bucket; and
a display controller configured to cause the bucket to be displayed on the display unit on the basis of the tilt angle.

5. The work vehicle according to claim 4, wherein
the first end part of the tilt cylinder is coupled to the bucket;
the second end part of the tilt cylinder is positioned between the tilt axis and the bucket when viewing the tilt cylinder from the axial direction; and
an interval between the first end part and the second end part in a horizontal direction is no less than the first line segment.

6. The work vehicle according to claim 4, wherein
the first end part of the tilt cylinder is coupled to the bucket; and
the second end part of the tilt cylinder is positioned on the opposite side of the bucket relative to a horizontal plane passing through the tilt axis when viewing the tilt cylinder from the axial direction.

7. The work vehicle according to claim 1, wherein
the bucket information computing unit specifies a position of the bucket on the basis of the tilt angle.

8. The work vehicle according to claim 1, further comprising
a display unit configured to display the bucket; and
a display controller configured to cause the bucket to be displayed on the display unit on the basis of the tilt angle.

9. The work vehicle according to claim 1, wherein
the first end part of the tilt cylinder is coupled to the bucket;
the second end part of the tilt cylinder is positioned between the tilt axis and the bucket when viewing the tilt cylinder from the axial direction; and
an interval between the first end part and the second end part in a horizontal direction is no less than the first line segment.

10. The work vehicle according to claim 1, wherein
the first end part of the tilt cylinder is coupled to the bucket; and
the second end part of the tilt cylinder is positioned on the opposite side of the bucket relative to a horizontal plane passing through the tilt axis when viewing the tilt cylinder from the axial direction.

11. A method for obtaining a tilt angle comprising:
detecting a stroke length of a tilt cylinder configured to cause a bucket to rotate about a tilt axis; and
obtaining a tilt angle of the bucket on the basis of the stroke length,
the obtaining the tilt angle step includes
calculating an angle formed by a first line segment and a second line segment when viewing the tilt cylinder from an axial direction of the tilt axis, the first line segment linking a first end part and the tilt axis of the tilt cylinder, the second line segment linking a second end part and the tilt axis of the tilt cylinder, and
calculating the tilt angle using the formed angle.

* * * * *